United States Patent [19]
Belart et al.

[11] Patent Number: 4,732,429
[45] Date of Patent: Mar. 22, 1988

[54] HYDRAULIC BRAKE SYSTEM WITH SLIP CONTROL

[75] Inventors: Juan Belart, Walldorf, Spain; Wolfram Seibert, Pfungstadt; Norbert Ocvirk, Offenbach, both of Fed. Rep. of Germany; Juergen Schonlau, Niedernhausen; Guenter Trach, Offenbach, both of Fed. Rep. of Germany

[73] Assignee: Alfred Teves GmbH, Frankfurt am Main, Fed. Rep. of Germany

[21] Appl. No.: 904,922

[22] Filed: Sep. 8, 1986

[30] Foreign Application Priority Data

Sep. 6, 1985 [DE] Fed. Rep. of Germany ....... 3531782

[51] Int. Cl.$^4$ .............................................. B60T 8/32
[52] U.S. Cl. ..................................... 303/114; 60/550; 60/582; 303/119
[58] Field of Search .................... 303/114, 119, 50–56, 303/92, 100; 188/355–359; 60/547.1, 550, 582

[56] References Cited

U.S. PATENT DOCUMENTS

| 4,440,454 | 4/1984 | Belart et al. | 303/114 |
| 4,521,061 | 6/1985 | Belart et al. | 303/114 |
| 4,555,144 | 11/1985 | Belart et al. | 303/119 X |
| 4,643,488 | 2/1987 | Reinartz | 303/114 |

FOREIGN PATENT DOCUMENTS

| 2605625 | 9/1976 | Fed. Rep. of Germany . |
| 3040562 | 5/1982 | Fed. Rep. of Germany . |
| 3418043 | 11/1985 | Fed. Rep. of Germany . |
| 2001720 | 2/1979 | United Kingdom . |
| 2086507 | 5/1982 | United Kingdom . |

Primary Examiner—Douglas C. Butler
Attorney, Agent, or Firm—James B. Raden; Robert P. Seitter

[57] ABSTRACT

A hydraulic brake system with slip control comprising a master cylinder (2) pressurizable by a hydraulic power booster (1). A booster sleeve (52) is provided which annularly encloses the booster piston (4), and which is slidably accommodated in the booster housing. The sleeve's end face directed towards the pressure chamber (10) of the booster (1) is applied by the pressure in the pressure chamber (10), while an annular chamber (59) filled with pressure medium and connected to a brake circuit (32) is constituted between the booster sleeve (52) with its head portion (61) and the bore (60) in the booster housing. The booster sleeve (52) is coupled to the booster piston (4) by way of a circlip (53) such that, on movement of the booster piston (4) in the direction of brake actuation, the booster sleeve (52) and the booster piston (4) will displace uniformly. On failure of the booster (1) and displacement of the booster piston (4) exclusively by way of the brake pedal (8), the booster sleeve (52) will remain in its initial position which brings about an abrupt change in ratio.

5 Claims, 1 Drawing Figure

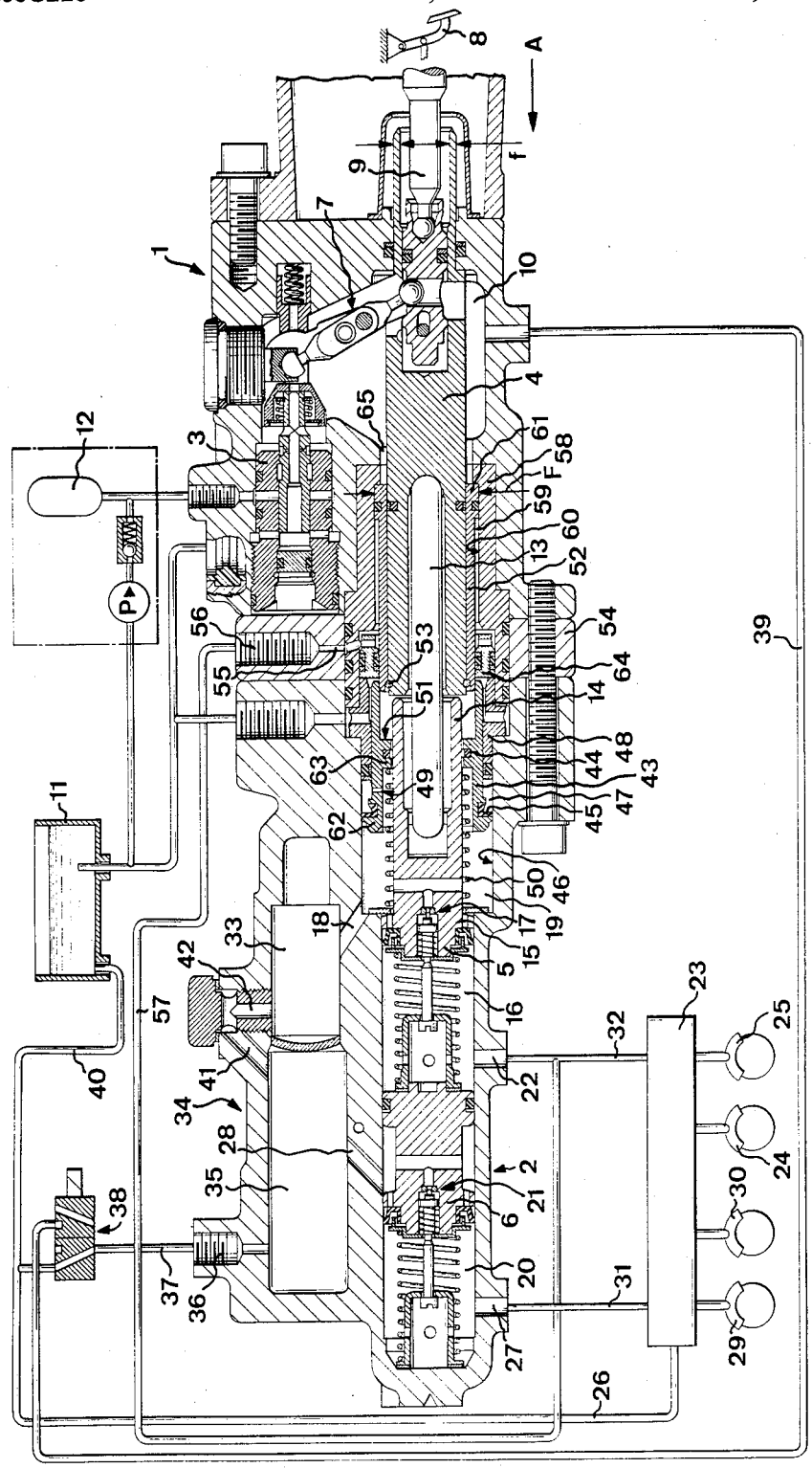

HYDRAULIC BRAKE SYSTEM WITH SLIP CONTROL

BACKGROUND OF THE INVENTION

The present invention relates to a hydraulic brake system with slip control for automotive vehicles comprising a master cylinder pressurizable by means of a hydraulic power booster. Valve means are provided between the master cylinder and the wheel brakes connected to the master cylinder. Through the intermediary of the valve means a pressure medium can be drawn from the wheel brakes. The pressure medium drawn from the wheel brakes is replenishable from the pressure chamber of the hydraulic power booster, wherein a limitation of the lift of the brake pedal will occur during the slip control.

A hydraulic brake system with the characteristics described is known from the German printed and published patent application No. 30 40 562.2. The known system is equipped with a hydraulic brake power booster, wherein a booster pressure which is proportional to the actuating force is adjustable by way of a pedal-actuatable brake valve. Through the intermediary of the hydraulic power booster, a tandem master cylinder whose working chambers are connected to wheel brakes is actuatable. The connections between the working chambers of the tandem master cylinder and the wheel brakes connected thereto are interruptable by means of electro-magnetically actuatable valve means. In addition, further valve means are associated with the wheel brakes, through the intermediary of which valve means a pressure medium can be drawn from the wheel brakes, if necessary, so that the effective brake pressure will decrease which, in the event of an imminent lock-up tendency, normally has the effect that the respective vehicle wheel is sufficiently re-accelerated.

The pressure medium drawn from the wheel brakes during the brake slip control is then replenished from the pressure chamber of the hydraulic power booster, the pressure medium prevailing in the pressure chamber of the hydraulic power booster being transmitted through the intermediary of additional valve means by way of the cups of the master cylinder pistons to the corresponding working chambers. In the known brake system it is necessary, with regard to a safeguarding of a minimum volume in the tandem master cylinder, that a limitation of the lift of the brake pedal takes place. When a pressurization of the working chambers of the tandem master cylinder occurs, a so-called positioning sleeve is, for that purpose, simultaneously pressurized in opposition to a spring force in the direction of brake release. The positioning sleeve thereby moves into abutment with a stop of the booster piston and prevents a further protrusion of the booster piston and the master cylinder pistons due to the prevailing effective surface ratios.

In another brake system of the type described (patent application No. P 35 08 709.9), the booster piston penetrates into an annular chamber arranged between the master cylinder and the brake power booster, which annular chamber is connected with the pressure chamber of a "cylinder with filling steps" and with the supply reservoir, while a valve actuatable by means of the pressure in the booster chamber is interposed in the pressure medium path leading from the annular chamber to the supply reservoir. The valve closes in one switching position the fluid medium passage to the supply reservoir, thus allowing the pressure medium to flow in from the annular chamber into the pressure chamber of the "cylinder with filling steps" during the braking operation, and connects in the other switching position the annular chamber with the supply reservoir. This known brake system is disadvantageous in that a "cylinder with filling steps" is provided outside the brake actuating unit, whereby the installation space required for this brake system is increased considerably.

The present invention has as an object to create a hydraulic brake system of the type described in a fashion such that, with the system working properly, a controlled reset of the brake pedal is carried out during the control action, and that an additional pressure medium volume is simultaneously delivered into the brake circuit, while a supply of additional volume is, however, not to take place in the event of a failure of the booster in the sense of an abrupt change in ratio. In addition, the brake system is to have a simple and compact design; in particular, the valves or cylinders are to be arranged outside the housing of the unit.

SUMMARY OF THE INVENTION

According to the invention, this object is achieved by means of a booster sleeve which annularly encloses the booster piston and whose end face direction towards the pressure chamber of the booster is acted upon by the pressure in the pressure chamber. The booster sleeve is coupled to the booster piston by way of a stop, for instance a circlip, in a fashion such that on movement of the booster piston in the direction of brake release, the booster sleeve will be entrained by the booster piston, and on displacement of the booster piston by way of the push rod articulated at the brake pedal in the direction of brake actuation, the booster sleeve will remain in its initial position. This booster sleeve which annularly encloses the booster piston requires only a comparatively small installation space and constitutes a component part which can be manufactured at low cost.

The booster sleeve enclosing the booster piston is expediently provided at its end directed towards the brake pedal with a step extending radially outwardly or a head portion, through the intermediary of which the booster sleeve is sealedly guided in a longitudinal bore of the booster housing. The portion of the booster sleeve which has a reduced outer diameter constituting together with the longitudinal bore an annular gap or annular chamber which communicates by way of a channel and/or a pressure line with a working chamber of the master cylinder or a brake line so that in the event of a longitudinal displacement of the booster sleeve. The pressure medium available in the annular chamber will be delivered as auxiliary volume into the brake circuit.

By preference, a positioning sleeve comprising a collar is held and guided on the piston step of the master cylinder piston, which piston step is directed towards the brake pedal, and constitutes together with the bore of the annular chamber enclosing the piston step and a bushing another annular chamber. The positioning sleeve is provided with anthrottle bore interconnecting the two annular chambers, while a sealing ring with sealing lip is arranged at the collar, which sealing ring provides an inflow of the pressure medium from one annular chamber into the other annular chamber. The positioning sleeve is provided with a shoulder extending radially inwardly which cooperates with the booster piston end directed towards the master cylinder, and which is displaceable in the direction of brake actuation by the said booster piston. The pressure medium encompassed in the annular chamber between the positioning sleeve and the bore for the annular chamber enclosing the rear step of the master cylinder piston will only be able to flow relatively slowly out of the annular chamber when the brake is released, the brake pedal thus being moved back into its initial position at a slowed down speed.

Advantageously, an annular part inserted in the longitudinal bore of the booster sleeve is provided. The annular part closes the annular chamber existing between the booster sleeve and the longitudinal bore on the master cylinder side and serves as a stop for the positioning sleeve.

In order to permit a displacement of the booster sleeve, the housing of the booster has an aperture or a bore enabling the passage of the booster piston, the inner width of the bore being smaller than the outer diameter of the head portion of the booster sleeve. The bore constitutes a pressure channel which connects the pressure chamber of the booster with the annular chamber in front of the booster sleeve.

BRIEF DESCRIPTION OF THE DRAWING

The present invention can be provided in various embodiments. One of these will be illustrated schematically in more detail in the accompanying drawing in which the single FIGURE shows the wiring diagram of a hydraulic brake system with slip control and a longitudinal cross-section through the brake pressure generator.

DETAILED DESCRIPTION

In the drawing, 1 designates a hydraulic power booster through the intermediary of which a tandem master cylinder 2 is actuatable. The hydraulic power booster is provided with a brake valve 3 which is arranged substantially parallel to the axis of the booster piston 4 and/or of master cylinder pistons 5, 6. The brake valve 3 communicates, by way of a lever-type actuating mechanism 7, with a push rod 9 connected by way of a brake pedal 8. The hydraulic power booster 1 is further provided with a pressure chamber 10 which is connected with an unpressurized supply reservoir 11 by way of the brake valve 3 when the brakes are in the inoperative position. When a force is applied onto the brake pedal 8, a pressure medium is transmitted from a hydropneumatic pressure accumulator 12 into the pressure chamber 10 so that a pressure which is proportional to the actuating force is generated in the pressure chamber.

The master cylinder piston 5 is arranged coaxially to the booster piston 4 and is displaceable in the direction of actuation through the intermediary of a rod 13 accommodated between the pistons 5, 4. The master cylinder piston 5 is shaped in the form of a stepped piston, the smaller-diameter piston step 14 being directed towards the booster piston 4 and the larger-diameter piston step 15 confining a working chamber 16 of the master cylinder 2. Normally, the working chamber 16 communicates with the unpressurized supply reservoir 11 by way of a valve which switches travel-sensitively. Between the piston steps 14, 15, the master cylinder piston 5 is provided with an annular surface which is directed towards an annular chamber 19. The master cylinder piston 6 is arranged coaxially to the pistons 4, 5 and is hydraulically displaceable in the direction of actuation by means of a pressure which is being built up in the working chamber 16. The master cylinder piston 6 confines a second working chamber 20 which is, in the inoperative position of the brakes, in communication with the in pressurized supply reservoir 11 by way of a valve 21 corresponding to the valve 17.

Communicating with the first working chamber 16 is a housing connection 22, connected to which are, by way of a pressure modulator 23, the wheel brakes 24, 25 situated, for instance, on the rear axle of an automotive vehicle. A housing connection 27, connected to which are, by way of the pressure modulator 23, the wheel brakes 29, 30 situated, for instance, on the front axle of the automotive vehicle, communicates with the working chamber 20 of the master cylinder 2. The pressure modulator 23, which is controllable by way of slip monitoring electronics that are not illustrated, is connected with the supply reservoir 11 by way of a return conduit 26. By means of an appropriate switching-over of the valves in the pressure modulator 23, which valves are associated with the wheel brakes, it will be possible to maintain the pressure in each wheel brake 29, 30, 24, 25 at a constant level or to reduce it, irrespective of the pressures prevailing in the working chambers 16, 20, so that an imminent wheel lock-up can be prevented.

The master cylinder 2 is provided with a channel 18 leading radially into the annular chamber 19 enclosing the master cylinder piston 5 and connecting the annular chamber with the chamber 33 of a compensating reservoir 34. In addition, the master cylinder 2 has a channel 28 leading into the chamber 35 of the compensating reservoir 34.

The compensating reservoir 34 is, by way of a connection 36 and a pressure line 37, connected with a magnetically operated directional control valve 38 which connects the compensating reservoir 34 either by way of the pressure line 39 to the pressure chamber 10 of the hydraulic power booster 1 or by way of the return conduit 40 to the supply reservoir 11. Both chambers 33, 35 of the compensating reservoir 34 are connected with each other by way of the bores 41, 42.

In the annular chamber 19, a positioning sleeve 43 surrounding the piston step 14 of the master cylinder piston 5 is longitudinally displaceably accommodated. The positioning sleeve is sealed relative to the step 14 by means of a sealing ring 44 and relative to the bore 46 by means of a ring with lip 45. The positioning sleeve 43 confines, together with the bore 46 and the bushing 48, an annular chamber 47 which is connected with the annular chamber 19 by way of a radial throttle bore 49 in the positioning sleeve 43. On actuation of the brakes (i.e., when the master cylinder piston 5 is moved to the left), thenpositioning sleeve 43 is displaced by means of the booster piston 4 in opposition to the force of the spring 50, the lip of the ring 45 thus permitting an admission of pressure medium from the annular chamber 19 into the annular chamber 47.

In the event that, during a braking operation, the wheels of the vehicle get into the slip area and the pressure in the wheel brakes 29, 30, 24, 25 is reduced by way of the modulator 23, pressure medium (under a higher pressure) will be supplied by way of the pressure line 39 and the directional control valve (main valve) 38 into the chambers 33, 35 of the compensating reservoir 34 and thus also by way of the sealing cups of the master cylinder pistons 5, 6 into the working chambers 16, 20 of the master cylinder 2 (dynamic flow-in). This controlled pressure will now act on the annular end face of thepositioning sleeve 43 as well, which end face is directed towards the annular chamber 19, and would move the positioning sleeve immediately to the right (in the direction of the brake pedal 8), if it had already been displaced to the left beforehand by means of the booster piston 4. The end face would also push the booster piston (4) back had there not been a pressure medium in the annular chamber 47 of the positioning sleeve 43. Now, the pressure medium can only flow back from the annular chamber 47 into the annular chamber 19 (by way of the throttle bore 49) in a throttled manner, the positioning sleeve 43 thus moving the booster piston 4 adjacent to the end face 51 into a specific (mean) position.

The (controlled) pressure prevailing in the pressure chamber 10 of the booster 1 will act both onto the cross-sectional area of the booster piston 4 and onto the end face of a booster sleeve 52 which encloses the booster piston 4 in a sealing fashion and is coupled to the latter by way of a circlip 53 so that the effective cross-sectional area of the booster piston, (which area acts by way of the push rod 13 onto the master cylinder piston 5), corresponds to the area F (less the area f of the guide sleeve 58), the pressure medium available in the annular chamber 59 (in the event of a properly operating booster 1) being transmitted into the brake line 32 by way of the channel 55 extending radially in the housing part 54, the connection 56 and the pressure line 57.

On failure of the booster 1, only the booster piston 4 will be displaceable in the direction of actuation (direction of arrow A) by way of the brake pedal 8 and the push rod 9, since the booster sleeve 52 which is no longer coupled to the piston 4 will remain in its initial position (as depicted in the drawing) which brings about an abrupt change in ratio.

What is claimed is:

1. A hydraulic brake system with slip control for automotive vehicles, comprising a master cylinder (2) pressurizable by means of a hydraulic power booster (1), wherein valve means (23, 38) are provided between the master cylinder (2) and wheel brakes (24, 25, 29, 30) connected to the master cylinder, through the intermediary of said valve means a pressure medium is drawn from the wheel brakes (24, 25, 29, 30), the pressure medium drawn from the wheel brakes being replenishable from a pressure chamber (10) of the hydraulic power booster (1), and wherein a limitation of the lift of a brake pedal (8) occurs during the slip control, wherein a booster sleeve (52) is provided which annularly encloses a booster piston (4) of said booster (1) and whose end face directed towards the pressure chamber (10) of the booster (1) is acted upon by the pressure in the pressure chamber (10), the booster sleeve (52) being coupled to the booster piston (4) by way of a stop in the form of a circlip (53), and whereupon movement of the booster piston (4) in the direction of brake release, the booster sleeve (52) is entrained by the booster piston (4), and on displacement of the booster piston (4) exclusively by way of a push rod (9) articulated at the brake pedal (8) in the direction of a brake actuation, the booster sleeve (52) will remain in its initial position.

2. The hydraulic brake system according to claim 1, wherein the booster sleeve (52) enclosing the booster piston (4) is, at its end directed towards the brake pedal (8), provided with a step extending radially outwardly in the manner of a head portion (61), through the intermediary of which the said booster sleeve is sealedly guided in a longitudinal bore (60) of a housing part, the portion of the booster sleeve (52) which has a reduced outer diameter constituting together with the longitudinal bore (60) a first annular chamber (59) which communicates by way of a channel (55) and a pressure line (57) with a working chamber (16) of the master cylinder (2) and a brake line (32).

3. The hydraulic brake system according to claim 2, wherein a positioning sleeve (43) comprising a collar (62) is held and guided on a piston step (14) of a master cylinder piston (5), which piston step is directed towards the brake pedal (8), and constitutes together with a bore (46) of a second annular chamber (19) enclosing the piston step (14) and a bushing (48) a third annular chamber (47), said positioning sleeve (43) being provided with a throttle bore (49) interconnecting the second annular chamber (19) and the third annular chamber (47), a sealing ring with sealing lip (45) being arranged at the collarn(62) of the positioning sleeve (43), which sealing ring provides an inflow of the pressure medium from the second annular chamber (19) into the third annular chamber (47), and the positioning sleeve (43) being provided with a shoulder (63) extending radially inwardly up to the step (14) of the master cylinder piston (5), said shoulder cooperating with the end of the booster piston (4) which end is directed towards the master cylinder (2) and being displaceable in the direction of the actuation by said booster piston.

4. The hydraulic brake system according to claim 3, wherein an annular part (64) inserted in the housing part's longitudinal bore (60) is provided for the booster sleeve (52), said annular part closing the first annular chamber (59) existing between the booster sleeve (52) and the longitudinal bore (60) on the master cylinder side and providing a stop for the positioning sleeve (43).

5. The hydraulic brake system according to claim 3, wherein the housing of the booster (1) has an aperture (65) enabling the passage of the booster piston (4), the inner width of the said aperture being smaller than the outer diameter of a head portion (61) of the booster sleeve, while the aperture (65) constitutes a pressure channel which connects the pressure chamber (10) of the booster (1) with the first annular chamber in front of the booster sleeve (52).

* * * * *